United States Patent [19]
Hattori et al.

[11] Patent Number: 5,243,188
[45] Date of Patent: Sep. 7, 1993

[54] NEUTRAL POSITION DETECTOR FOR STEERING WHEELS HAVING A FIRST AND SECOND ROTORS WITH ALIGNED SLOTS

[75] Inventors: Masaichi Hattori; Keiichi Umehara, both of Aichi, Japan

[73] Assignee: Kabushiki Kaisha Tokai Rika Denki Seisakusho, Aichi, Japan

[21] Appl. No.: 951,237

[22] Filed: Sep. 25, 1992

[30] Foreign Application Priority Data

Sep. 26, 1991 [JP] Japan ................. 3-78084[U]
Jun. 26, 1992 [JP] Japan ................. 4-44626[U]

[51] Int. Cl.$^5$ ............................................. G01D 5/34
[52] U.S. Cl. .......................... 250/231.17; 364/424.05; 180/79.1; 250/231.16
[58] Field of Search ............ 250/231.14, 231.15, 250/231.16, 231.17, 231.18, 237 G; 364/424.05; 180/79.1, 142

[56] References Cited

U.S. PATENT DOCUMENTS 5,032,996 7/1991 Shiraishi ..................... 180/79.1
5,061,848 10/1991 Choi ........................... 250/231.18

FOREIGN PATENT DOCUMENTS 3-528056 8/1991 Japan .

Primary Examiner—David C. Nelms
Assistant Examiner—Que T. Le
Attorney, Agent, or Firm—Limbach & Limbach

[57] ABSTRACT

A neutral position detector detects the neutral position of a steering wheel, and includes a first rotor which rotates integrally with a steering shaft. The first rotor has a slot which is detectable for identifying the steering wheel position. The detector further includes a second rotor which is rotatable interlockingly with the first rotor. A power transmission mechanism is provided to cause the second rotor to rotate intermittently by a predetermined rotation angle, each time the first rotor completes one revolution. The second rotor has a slot for detecting the position of the steering wheel. When the slots of the first and second rotors become aligned, the detector outputs a detection signal indicative of the position of the steering wheel.

6 Claims, 11 Drawing Sheets

NEUTRAL POSITION DETECTOR FOR STEERING WHEELS HAVING A FIRST AND SECOND ROTORS WITH ALIGNED SLOTS

This application claims the priority of Japanese Utility Model Application Nos. 3-78084 filed Sep. 26, 1991, and 4-44626 filed Jun. 26, 2992 which are incorporated herein by reference.

BACKGROUND OF THE INVENTION

1. Field of the Invention

The present invention relates to a neutral position detector for detecting neutral position of a vehicle steering wheel.

2. Description of the Related Art

Neutral position detectors are generally employed in electric control units for vehicle suspensions units or devices which emit alarm signals whenever the steering wheel is turned beyond a predetermined position or angle. A conventional neutral position detector for a steering wheel is illustrated in FIG. 16 as a rotation angle detector for a steering wheel. A rotor 102 is connected to a steering shaft 101 so as to rotate integrally therewith. The rotor 102 has a plurality of peripheral slots 103 for detecting the rotation angle of a steering wheel (not shown). The rotor 102 also has an inner slot 104 for detecting the neutral position of the steering wheel. A detector 105 is disposed adjacent to the rotor 102, and includes a photo-interrupter 106 for detecting the rotation angle, a photo-interrupter 107 for detecting the rotational direction and a photo-interrupter 108 for detecting the neutral position. When the steering wheel is turned 360°, the rotor 102 is also turned 360° in synchrony with the steering shaft 101. The photo-interrupter 108 detects the slot 104 every time the rotor 102 is turned 360°, and outputs a detect signal. Accordingly, the neutral position detection signal is given plurally corresponding to the number of rotations of the steering wheel. The number of rotations of the steering wheel can be detected by counting the number of the neutral position detection signals by means of an electronic counter.

When the rotor 102 is rotated, the photo-interrupters 106 and 107 detect the rotation angle detection slots 103, and output signals indicative of the rotation angle and the rotation direction of the rotor 102 and of the steering wheel. Thus, the position of the steering wheel can be detected from the number of rotations, the rotation angle and direction of the steering wheel.

A power supply to the neutral position detector is interrupted when the engine is not running in order to optimize consumption. Therefore, a memory device is incorporated into the electronic circuit so that the position of the steering wheel before the engine is stopped may be stored therein.

However, if the steering wheel is turned when the engine is not running, the position of the steering wheel stored in the memory device and the real position thereof will not match. Such mismatch occurs because the position of the steering wheel is detected based on the change in the number and phase of the detection signals from the respective photo-interrupters 106 to 108. Accordingly, the neutral position detector does not detect any change in the number of detection signals when the steering wheel is not rotated, and when the engine is started, although it can detect the slots of the rotor. Therefore, if the steering wheel is turned while the engine is stopped, the detector cannot detect the position of the steering wheel.

Additionally, the detection signals from the respective photo-interrupters 106 to 108 must be processed suitably in the electronic circuit even when only the neutral position of the steering wheel is to be detected. The processing procedures are complex, and thus requires a complicated electronic circuit.

SUMMARY OF THE INVENTION

The present invention addresses the foregoing problems. It is a first object of the invention to provide a neutral position detector which can detect the neutral position of a steering wheel without resorting to complex processing procedures by electronic circuits. Another object of the invention is to provide a neutral position detector having a simple structure, which can detect the neutral position of a steering wheel even when the steering wheel is turned while the engine of a vehicle is stopped.

In order to attain the above objects, the detector according to the present invention has a first rotor which rotates integrally with a steering shaft. The first rotor has a first opening which needs to be detected in order to identify the neutral position of the steering wheel. The detector includes a second rotor which is rotated in an interlocked relationship with the first rotor. The second rotor is rotated intermittently by a power transmission mechanism, by a predetermined angle, each time the first rotor is rotated 360°. The second rotor has a second opening which needs to be detected in order to identify the neutral position of the steering wheel. The detector outputs a predetermined neutral position detection signal whenever the first opening and the second opening are brought into alignment.

BRIEF DESCRIPTION OF THE DRAWINGS

The features of this invention that are believed to be novel are set forth with particularity in the appended claims. The invention, together with the objects and advantages thereof, may best be understood by reference to the following description of the presently preferred embodiments, taken in conjunction with the accompanying drawings in which:

DESCRIPTION OF THE PREFERRED EMBODIMENTS

Figure 1A:
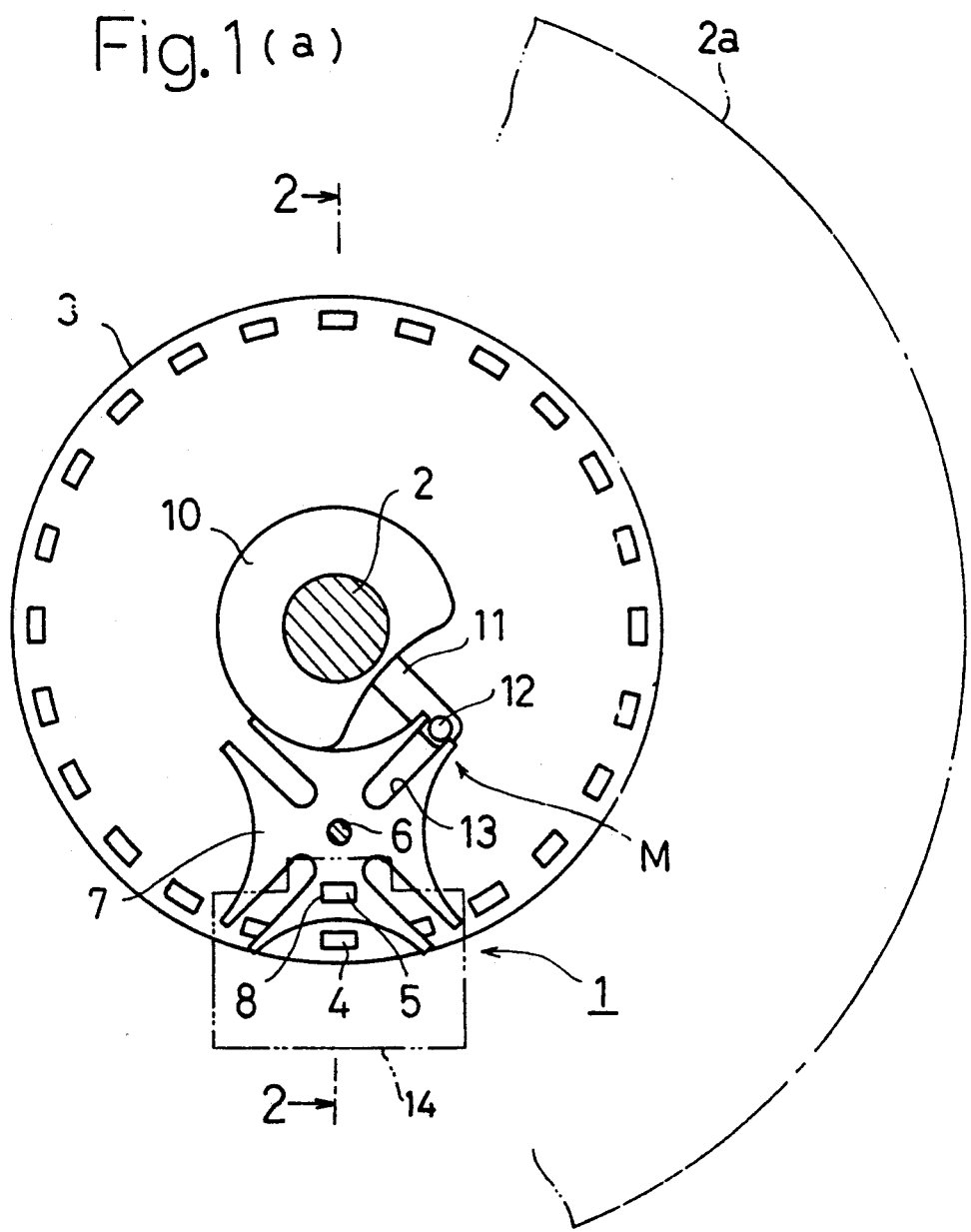
FIG. 1(a) is a front view of a detector according to a first embodiment of the invention.

The detector for detecting the absolute neutral position of a steering wheel according to a first embodiment of the invention will now be described referring to FIGS. 1 to 3.

A neutral position detector 1 is attached to a steering shaft 2. The detector 1 has a disc-shaped first rotor 3 secured to the steering shaft 2 and rotates integrally therewith. The first rotor 3 has a plurality of slots 4 for detecting the rotation angle. The slots 4 are located along the periphery of the first rotor 3 and are equidistally distanced from each other and from the axis of the steering shaft 2.

The first rotor 3 has a first opening 5 which needs to be detected in order to identify the neutral position of the steering wheel 2a. The fist opening 5 is located radially between the slots 4 and the center of the steering shaft 2. A second rotor 7 is rotatably supported on a rotary shaft 6, which is parallel with the steering shaft 2, at a position adjacent to the first rotor 3. The second rotor 7 has a second opening 8 which needs to be detected in order to identify the absolute neutral position of the steering wheel. The opening 8 is defined at a generally location close to the periphery of the second rotor 7. The absolute neutral position of the steering wheel exists only within the lock-to-lock span (rotatable range) of the steering wheel. The absolute neutral position means the position of the steering wheel when the front tires of the vehicle are positioned in the straight forward direction.

The rotation of the steering shaft 2 is transmitted intermittently to the second rotor 7 via a power transmission mechanism M which includes a Geneva gear and a drive cam disc 10. The second rotor 7 includes the Geneva gear. The disc 10 is secured to the steering shaft 2 and is rotatable integrally therewith. The disc 10 includes a lever 11 with a roller 12 supported thereon. The Geneva gear 7a has four radial notches 13, which engage and disengage from the roller 12 each time the disc 10 makes a complete revolution. This will consequently allow the second rotor 7 to be rotated by 90°.

A sensor 14 is disposed relative to the rotors 3 and 7. The sensor 14 has a photo-interrupter 15 for detecting the neutral position, a photo-interrupter 16 for detecting the rotation angle, and a photo-interrupter 17 for detecting the rotational direction. These photo-interrupters 15, 16 and 17 include light emitting elements 15a, 16a and 17a and corresponding light receiving elements 15b, 16b and 17b.

Figure 1B:
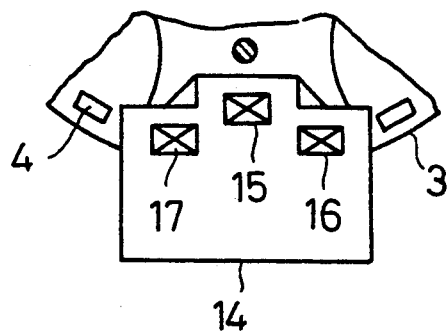
FIG. 1(b) is a front view of a sensor for use in the detector of FIG. 1(a)
Figure 2:
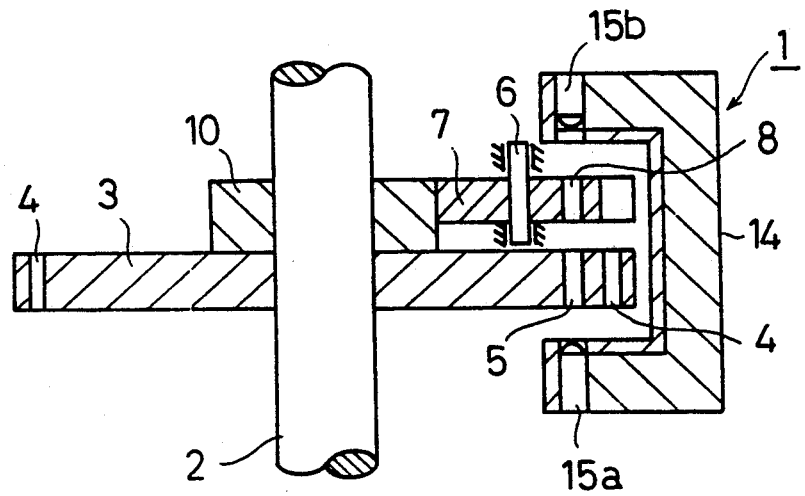
FIG. 2 is a cross sectional view of the detector taken along line 2—2 of FIG. 1(a)
Figure 3:
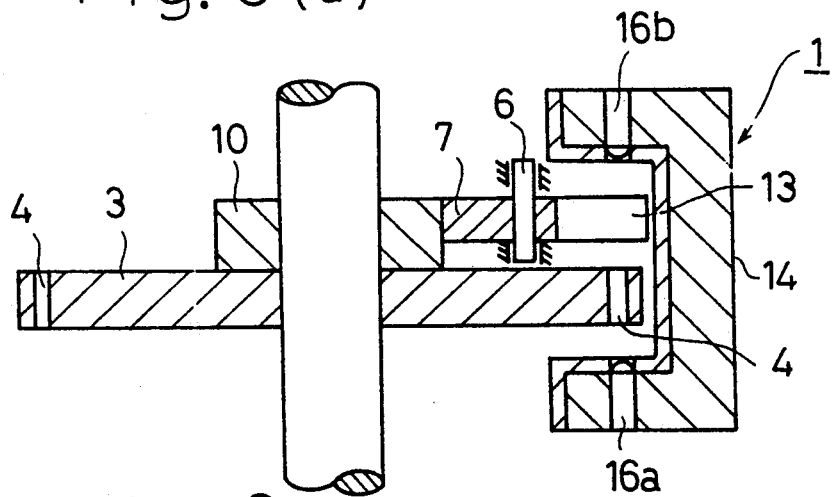
FIGS. 3(a) and 3(b) are cross sectional view of the detector taken along lines 2—2 of FIG. 1(a), showing a steering wheel rotated in the clockwise and counterclockwise directions, respectively.
Figure 3:
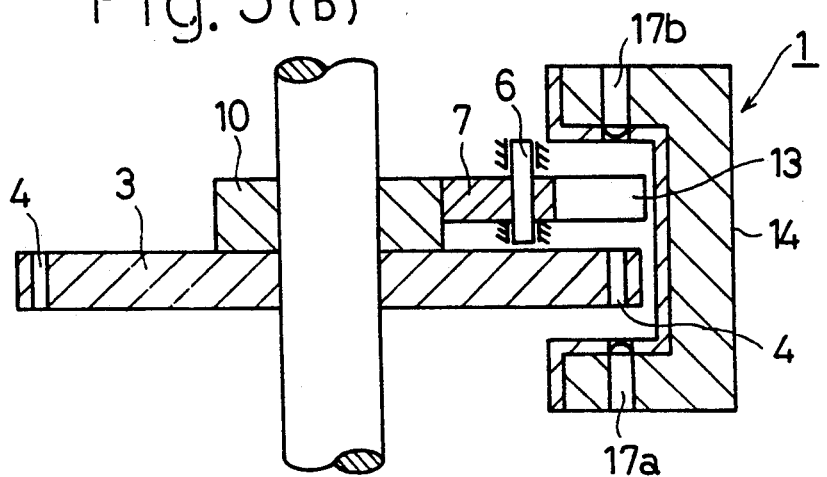

As shown in FIGS. 1(a), 1(b) and 2, when the steering wheel 2a is in the absolute neutral position, the first opening 5 of the first rotor 3 is aligned with the second opening 8 of the second rotor 7. In this state, the light from the light emitting element 15a of the photo-interrupter 15 passes through these openings 5 and 8 to reach the light receiving element 15b, which outputs a neutral position detection signal. When the steering wheel is turned clockwise or counterclockwise from this neutral position, the steering shaft 2, rotor 3 and disc 10 are rotated integrally therewith. The rotation of the disc 10 is transmitted intermittently to the second rotor 7. The rotational ratio i of the first rotor 3 to the second rotor 7 can be predetermined from the number of notches 13 in the second rotor 7. The slots 4 pass between the pair of elements 16a and 16b (17a and 17b) of the photo-interrupter 16 (17) to allow the light beam to intermittently pass between these elements. The respective photo-interrupters 16 and 17 output predetermined signals, and the rotational direction and rotation angle of the steering wheel can be detected based on these signals.

The first opening 5 of the first rotor 3 and the second opening 8 of the second rotor 7 are aligned only in the absolute neutral position of the steering wheel. At other positions, within the lock-to-lock span of the steering wheel, the openings 5 and 8 are not co-aligned and thus do not allow the photo-interrupter 15 to output a neutral position detection signal.

For example, provided that the preset rotational ratio i of the first rotor 3 to the second rotor 7 is four to one (4:1), and that the slots 5 and 8 have the same size, the opening 8 locates at a position staggered from the first opening 5 even when the first rotor 3 makes a full revolution and the first opening 5 reaches the optical axis of the photo-interrupter 15. In this state, no neutral position detection signal is output from the photo-interrupter 15. It is only when the steering wheel, located in the absolute neutral position that the openings 5 and 8 are aligned. The absolute neutral position is again reached after four revolutions of the first rotor 3.

Accordingly, if the lock-to-lock span of the steering wheel is set to less than four full revolutions from the absolute neutral position, the neutral position detection signal is not output. Accordingly, even when the steering wheel is rotated once from the absolute neutral position to assume an apparent neutral position while the control systems of the vehicle are deactivated, no inconsistency occurs between the real position of the steering wheel and the position to be detected by the detector, thus enabling an accurate neutral position detection.

In this first embodiment, the second rotor 7 is rotated intermittently and is temporarily locked by the engagement of the roller 12 with the notch 13 each time the second rotor 7 makes a stop after rotation. Accordingly, the positional relationship between the first opening 5 and the second opening 8 will not change.

Figure 4:
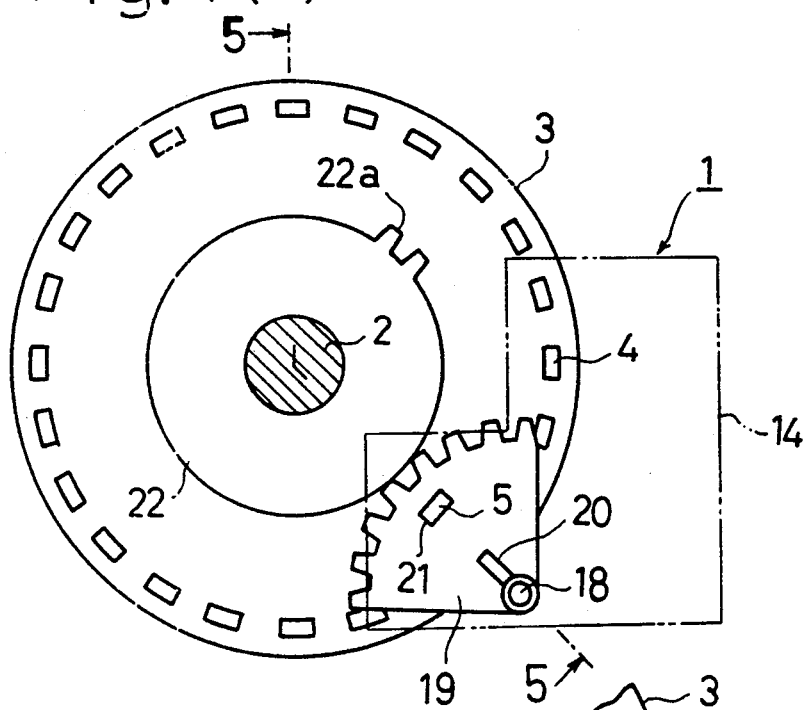
FIG. 4(a) is a front view of the detector according to a second embodiment of the invention.
FIG. 4(b) is a front view of a sensor for use in the detector of FIG. 4(a)
Figure 4:
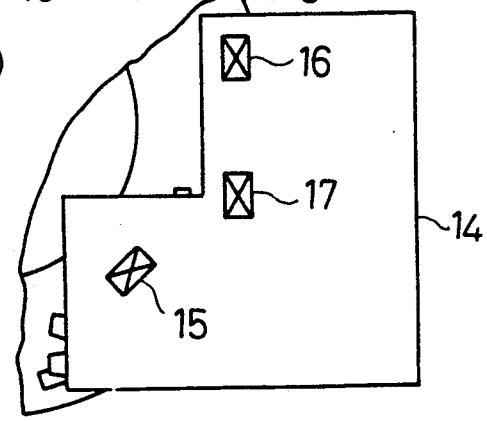
Figure 5:
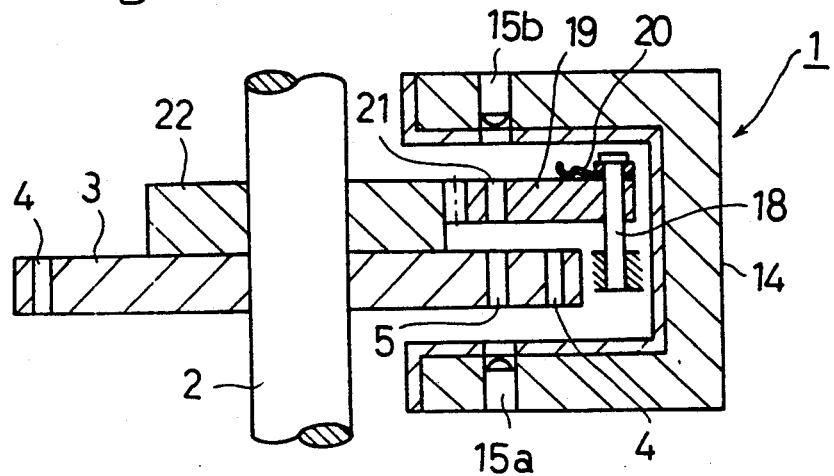
FIG. 5 are cross sectional view of the detector taken along lines 5—5 of FIG. 4(a)
Figure 6A:
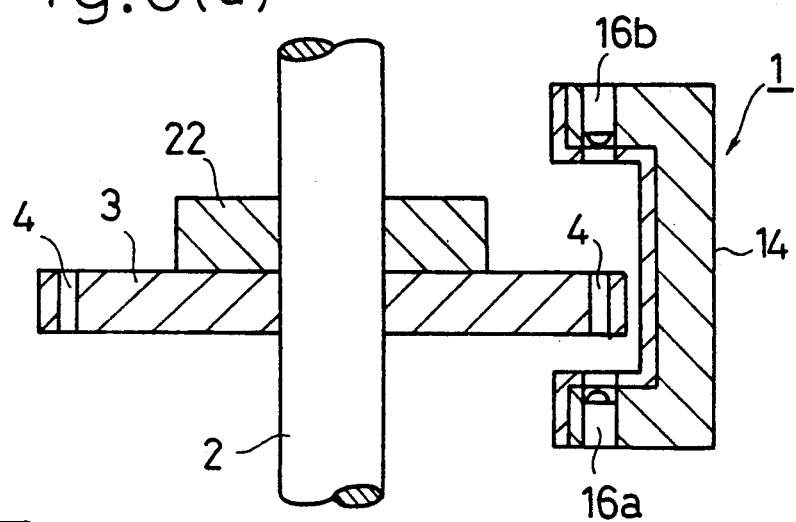
FIGS. 6(a) and 6(b) are cross sectional view of the detector taken along lines 5—5 of FIG. 4(a) showing the steering wheel rotated in the clockwise and counterclockwise directions, respectively.
Figure 6B:
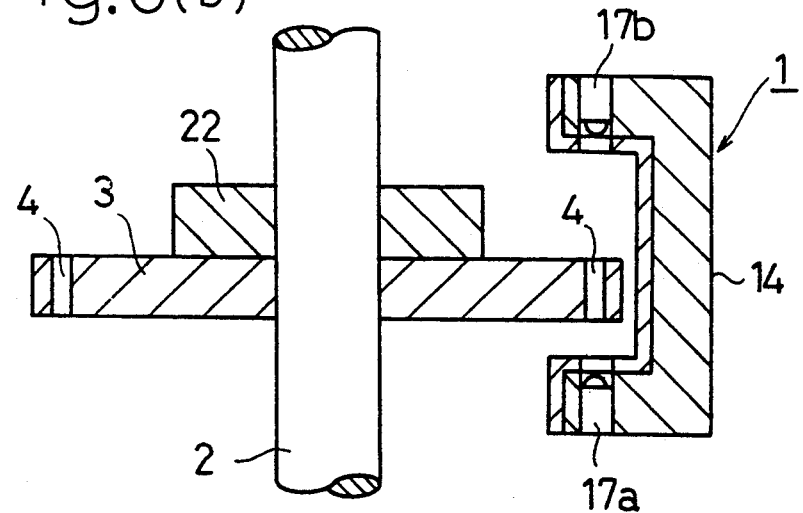

The second embodiment of the present invention will now be described by comparison with the first embodiment, and in reference to FIGS. 4 to 6.

In the second embodiment, the Geneva gear used in the first embodiment is replaced by another power transmission mechanism M. A sectorial outer gear 19 is rotatably supported, adjacent to the periphery of a first rotor 3, on a fixed shaft 18 parallel to the steering shaft 2. The gear 19 forms a second rotor. Part of the outer gear 19 extends over the peripheral portion of the rotor 3. A leaf spring 20 is secured to the fixed shaft 18. The leaf spring 20 presses against the upper surface of the outer gear 19, for causing it to resist rotation. Thus, the outer gear 19 normally assumes a stand-still position. A opening 21 (second opening) for detecting the neutral position is defined in the outer gear 19. Another outer gear 22 is fitted to the steering shaft 2 so as to be rotatable integrally therewith. The outer gear 22 has a couple of gear teeth 22a extending from the outer circumference thereof. Each time the outer gear 22 makes a complete revolution, the gear teeth 22a engage the outer gear 19 within a predetermined range of rotation angle, to cause the outer gear 19 to rotate intermittently within a predetermined range of rotation angle.

In this second embodiment, the opening 5 of the rotor 3 and the opening 21 of the outer gear 19 are again aligned only at the absolute neutral position of the steering wheel. In this state, the photo-interrupter 15 outputs a neutral position detection signal. At the other positions within the lock-to-lock span of the steering wheel, the openings 5 and 8 are located at staggered positions relative to the light path of the photo-interrupter 15 and do not allow the photo-interrupter 15 to output a neutral position detection signal.

A third embodiment of the present invention will now be described referring to FIGS. 7 to 14.

The neutral position detector according to the third embodiment is accommodated in a housing 51. The housing 51 includes a casing 52 and a cover 53. The cover 53 is fitted and secured to the casing 52. A mounting lip 54 provided on the casing 52 can be fastened to a car body (not shown) to securely mount the housing 51 thereon.

Figure 7:
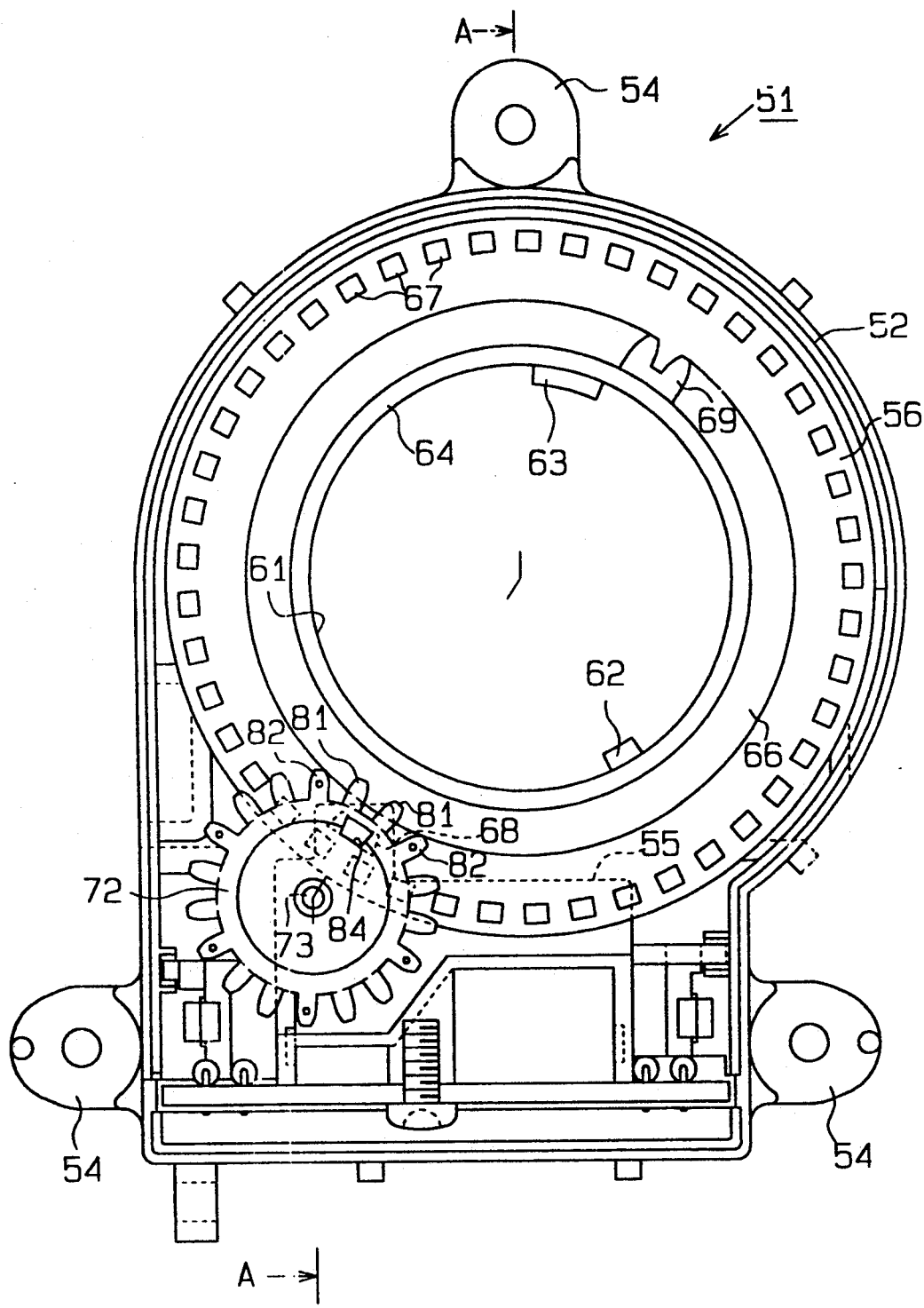
FIG. 7 is a front view of a detector according to a third embodiment of the invention.
Figure 8:
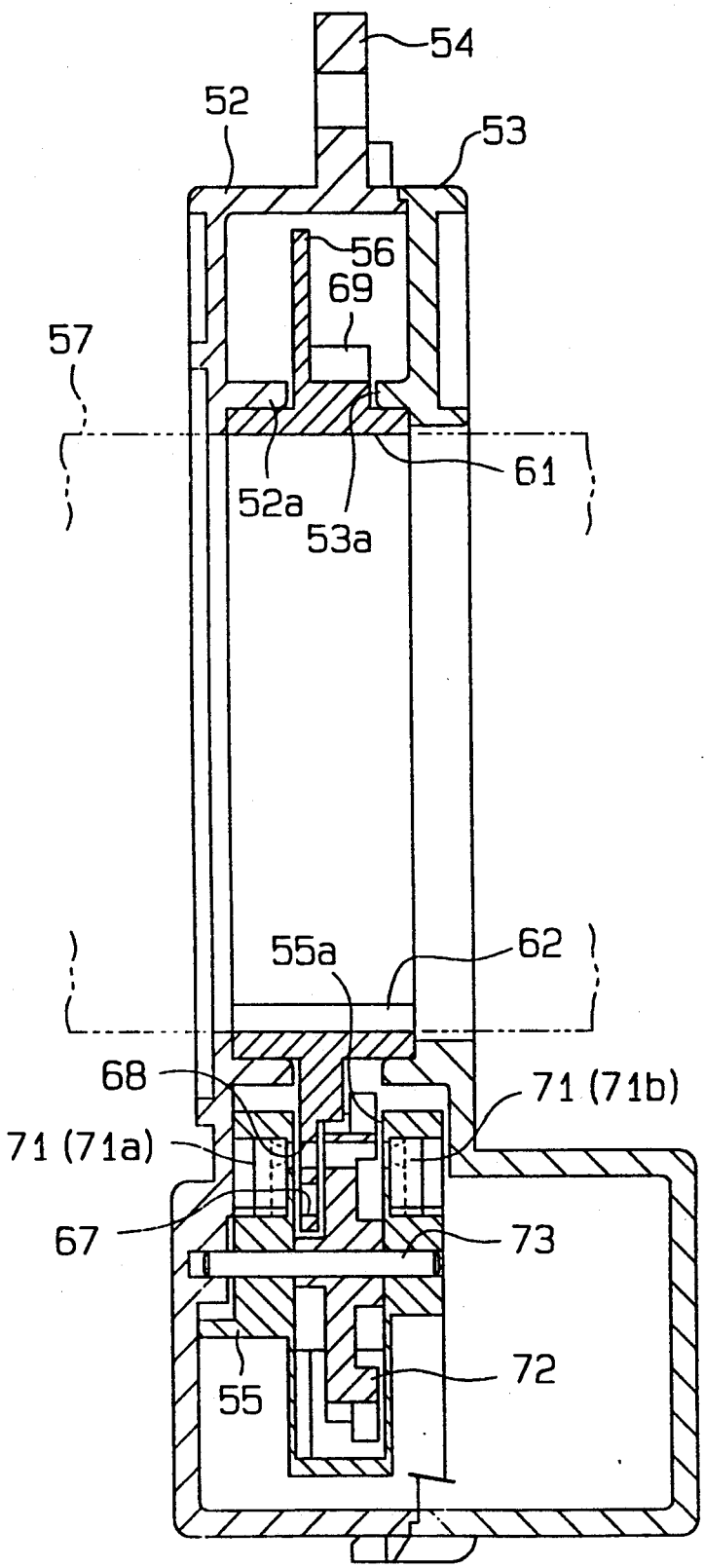
FIG. 8 is a cross sectional view taken along line A—A in FIG. 7.

FIG. 7 is a front view of the neutral position detector, in which the cover 53 is removed from the housing 51. A rotor 56 is rotatably accommodated in the housing 51. A through hole 61 is defined at the center of the rotor 56, in which a steering shaft 57 is inserted, as shown in FIG. 8. A couple of ribs 62 and 63 are formed on the inner circumference of the through hole 61, and are fitted in engagement grooves (not shown) defined in a steering shaft 57, so that the rotor 56 may be secured thereon.

Figure 9:
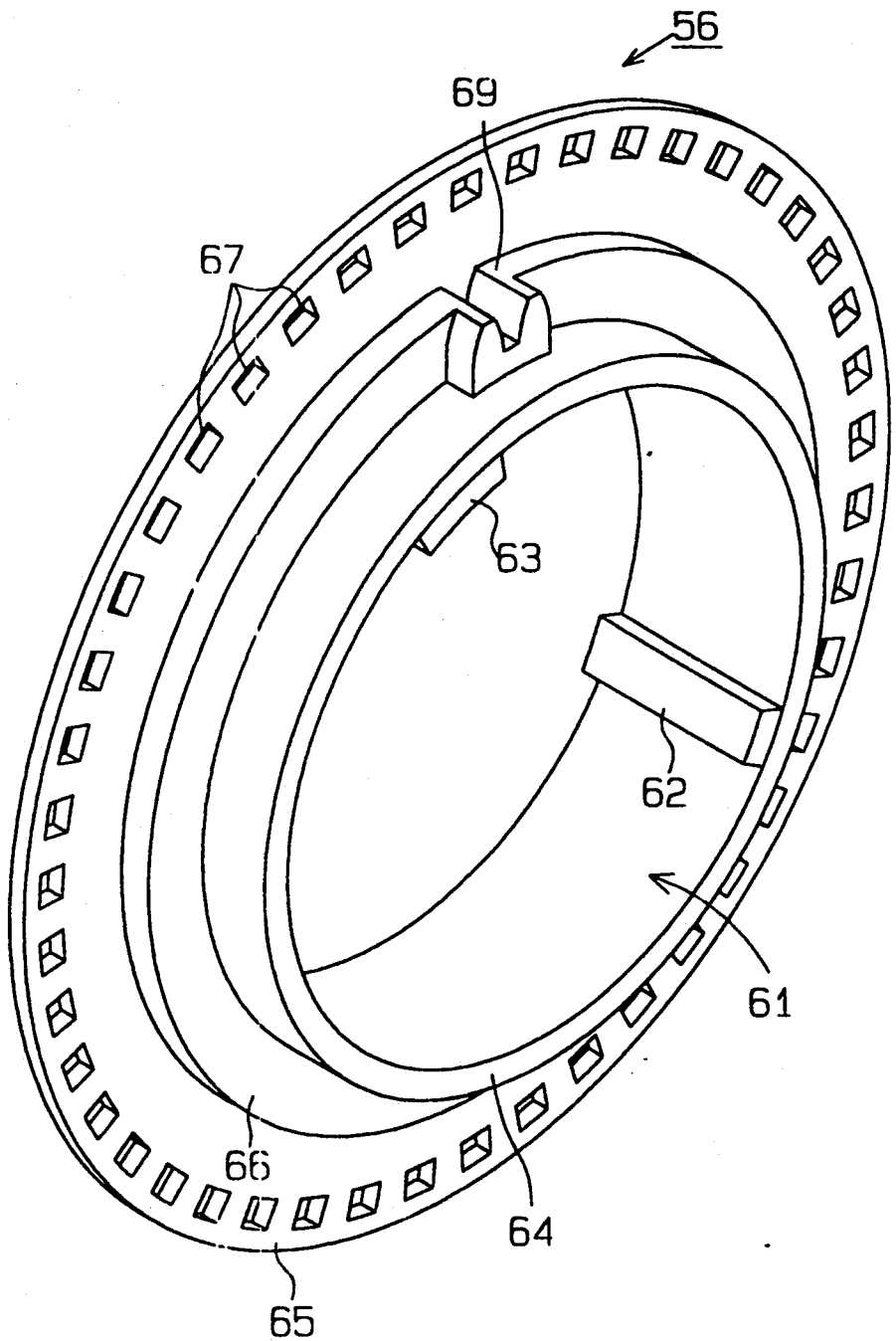
FIG. 9 is a perspective view of a rotor used in the detector of FIG. 7.
Figure 10:
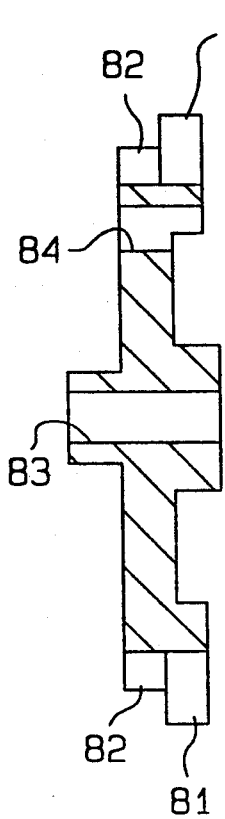
FIG. 10(a) is a plan view of a pinion used in the detector of FIG. 7.
FIG. 10(b) is a cross sectional view taken along line B—B of FIG. 10(a)
FIG. 10(c) is a cross sectional view taken along line C—C of FIG. 10(a)
FIG. 10(d) is a cross sectional view taken along line D—D of FIG. 10(a)
Figure 10:
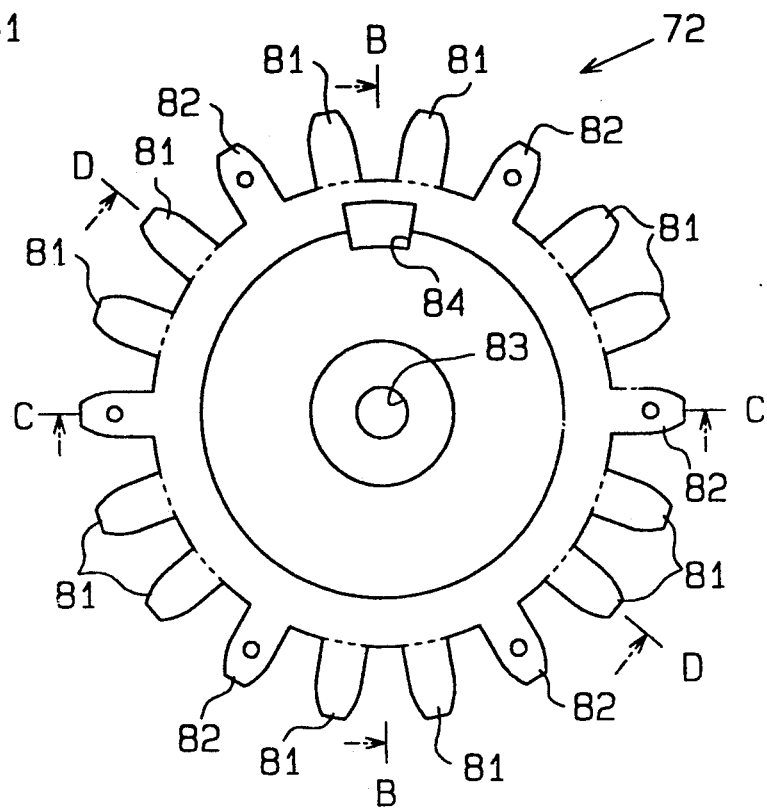
Figure 10:
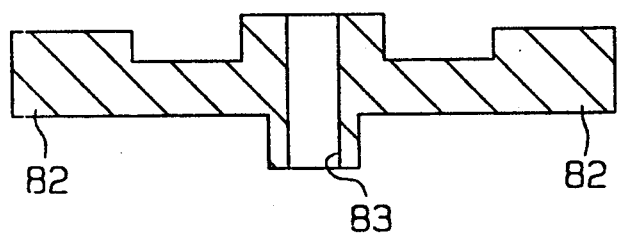
Figure 10:
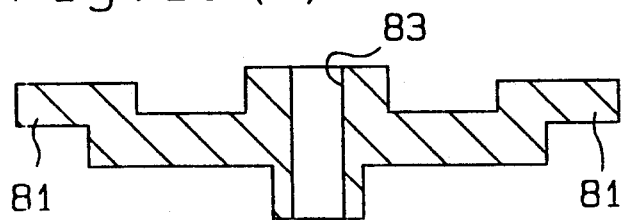

The rotor 56 has a cylindrical portion 64, a flange 65 and a step 66, as shown in FIG. 9. The through hole 61 penetrates through the cylindrical portion 64. Guide walls 52a and 53a are formed on the casing 52 and the cover 53, respectively, corresponding to the outer diameter of the cylindrical portion 64. Thus, the cylindrical portion 64 can be rotated smoothly in slide contact with the respective guide walls 52a and 53a, causing no backlash of the rotor 56.

The flange 65 is provided on the outer circumference of the cylindrical portion 64. The flange 65 has a plurality of slots 67 for detecting rotation angle, and which are equidistally separated along the periphery. As shown in FIG. 7, a opening 68 (first opening) for detecting the neutral position, is defined in the flange 65 at a slightly inward position relative to the slots 67. The step 66 is provided around the outer circumference of the cylindrical portion 64 and has a uniform thickness.

The step 66 has a couple of gear teeth 69. Accordingly, the step 66 constitutes an intermittent gear. The thickness of the gear teeth 69 is designed to be greater than the thickness of the step 66. The gear teeth 69 are formed at a position of point symmetry relative to the opening 68.

As shown in FIG. 8, a holder 55 is securely fixed to the casing 52 within the housing 51, and has a recess 55a to allow passage of the flange 65 of the rotor 56 therethrough. The holder 55 has a photo-interrupter for detecting the rotation angle, a photo-interrupter for detecting the rotational direction (not shown), a photo-interrupter 71 for detecting the neutral position, and a pinion 72.

The pinion 72 is disposed in the recess 55a of the holder 55 and is rotatably supported by a shaft 73 which penetrates the axial bore 83. As shown in FIG. 8, the central portion of the pinion 72 is in slide contact with the holder 55, so that the pinion 72 can be rotated smoothly with no backlash in the holder 55.

As shown in FIGS. 10(a) to 10(d), the pinion 72 has eighteen gear teeth, and the twelve gear teeth 81 (hereinafter referred to as thinner teeth) out of eighteen have a thickness smaller than that of the remaining six gear teeth 82 (hereinafter referred to as thicker teeth). The thicker teeth 82 appear every two other thinner teeth 81.

As the rotor 56 is rotated, the pinion 72 is rotated intermittently based on the engagement of the gear teeth 69 with the gear teeth 81 and 82 of the pinion 72. At the end of each intermittent rotation, a couple of adjacent thicker teeth 82 of the pinion 72 are abutted against the circumference of the step 66 of the rotor 56, as shown in FIG. 7. However, the thinner teeth 81 of the pinion 72 will not abut against the step 66, during the rotation of the rotor 56.

Further, the pinion 72 has a opening 84 (second opening) for detecting the neutral position. The photo-interrupter 71 for detecting the neutral position includes a light emitting element 71a and a light receiving element 71b. These elements 71a and 71b are disposed on each side of the pinion 72 so as to oppose each other. When the pinion 72 rotates, the opening 84 passes between the two elements 71a and 71b. As shown in FIG. 7, when the steering wheel is at the absolute neutral position, the opening 68 of the rotor 56 is aligned with the opening 84 of the pinion 72. In this state, the light from the light emitting element 71a passes through the openings 68 and 84, and reaches the light receiving element 71b. Thus, the light receiving element 71b outputs a neutral position detection signal.

The operations of the neutral position detector according to the third embodiment will now be described referring mainly to FIGS. 11 to 14.

Figure 11:
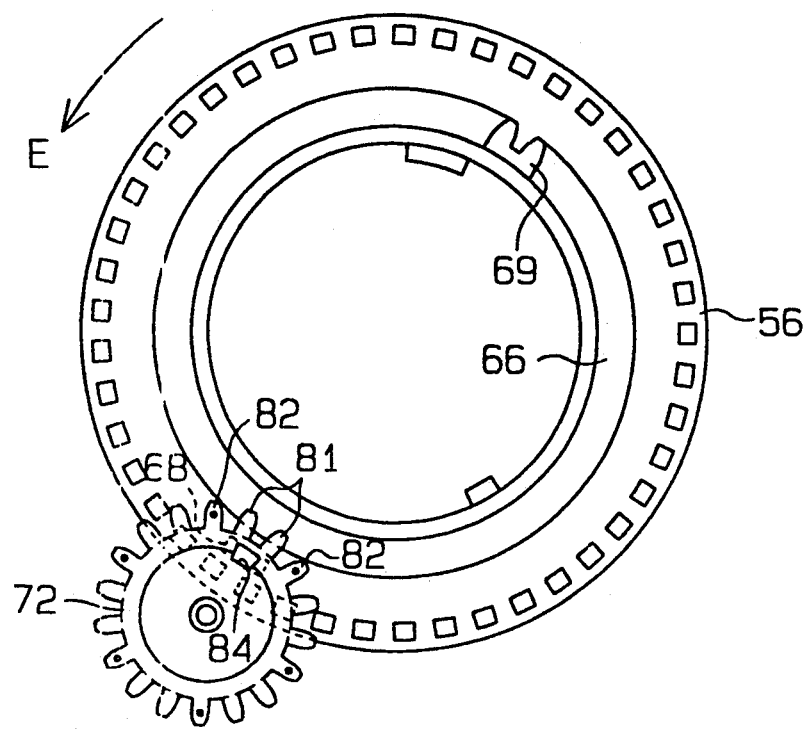
FIGS. 11 through 14 illustrate a series of positions of motions of the detector of FIG. 7.

FIGS. 7 and 11 each show a relative positional relationship between the rotor 56 and the pinion 72, when the steering wheel is at the absolute neutral position. In this state, the photo-interrupter 71 outputs a neutral position detection signal.

Figure 12:
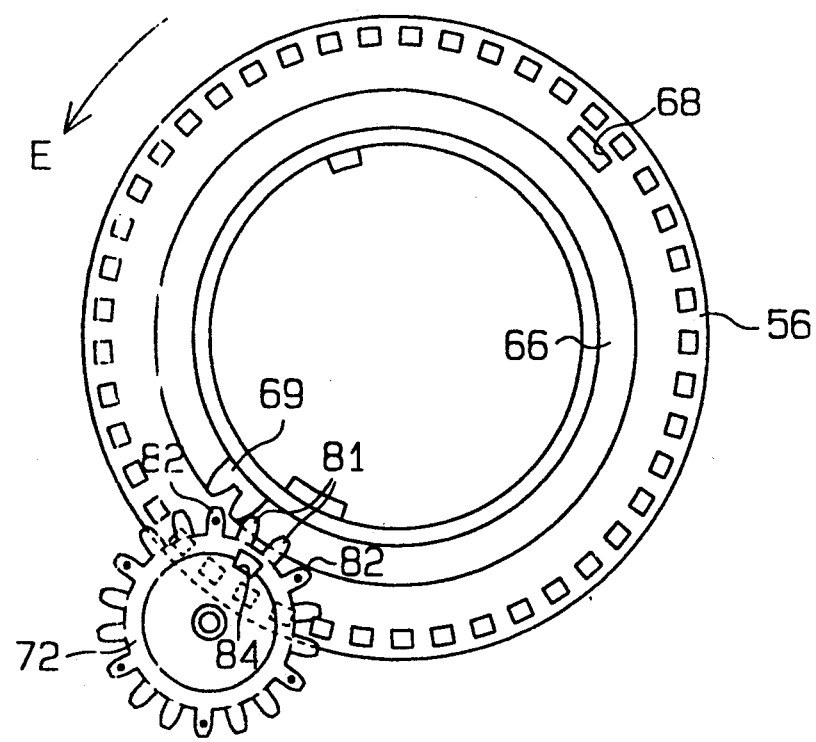

FIG. 12 shows a state where the steering wheel (not shown) is turned counterclockwise by a driver to turn the rotor 56 counterclockwise (E) by about 170°, from the state shown in FIG. 11. During the rotation of the rotor 56, the pair of thicker teeth 82 of the pinion 72 are merely in slide contact with the circumference of the step 66, and the two thinner teeth 81 separated from the step 66. Accordingly, there is no force which causes the pinion 72 to rotate, and the pinion 72 assumes a stand-still posture.

Figure 13:
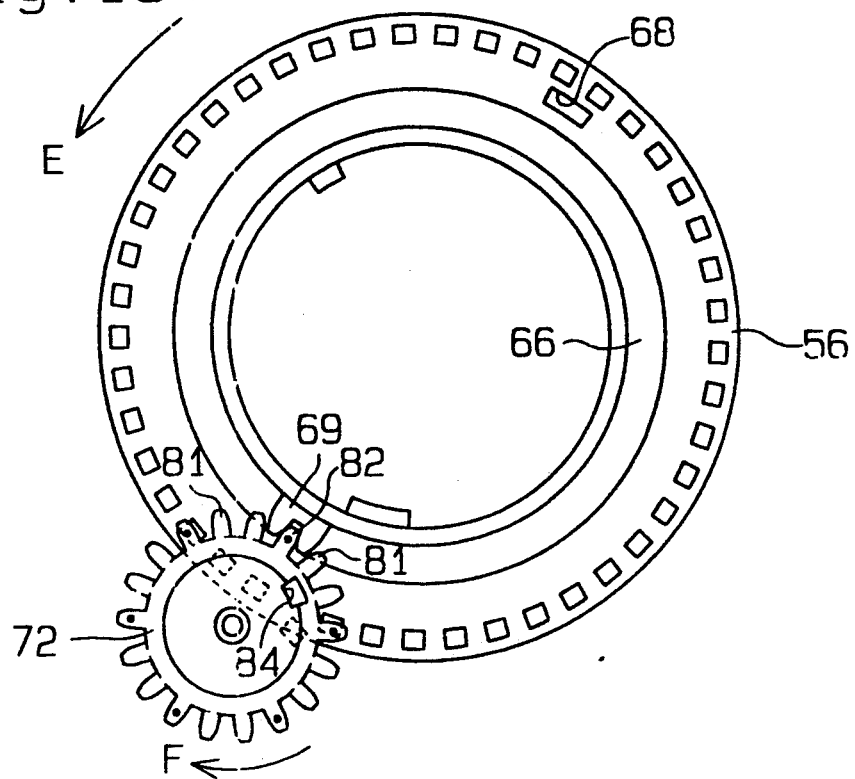

FIG. 13 shows a state where the steering wheel is further turned counterclockwise (E) from the state shown in FIG. 12. As the rotor 56 rotates, the gear teeth 69 of the step 66 engage one of the thicker teeth 82 to be caught between the two thinner teeth 81 located on each side of the thicker teeth 82. Accordingly, the gear teeth 69 can securely be engaged with the pinion 72 in order to accurately transmit the rotation of the rotor 56 to the pinion 72. Consequently, the pinion 72 is rotated clockwise (F) only while the thicker tooth 82 is in engagement with the gear teeth 69.

Figure 14:
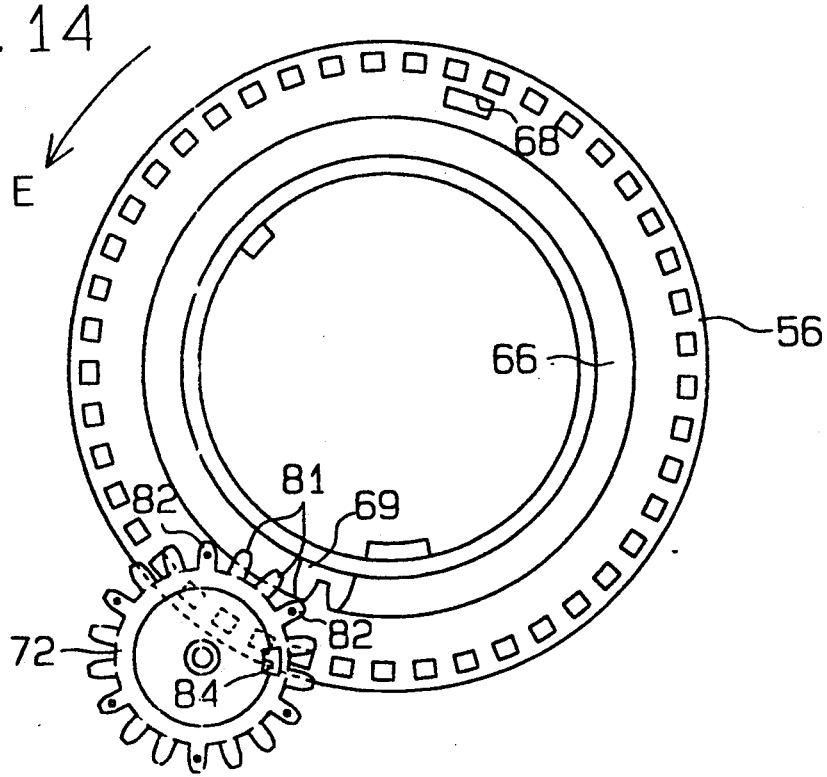

FIG. 14 shows a state where the rotor 56 is still further turned counterclockwise (E) from the state shown in FIG. 13. With the rotation of the rotor 56, the gear teeth 69 are disengaged from the thicker tooth 82, and another pair of adjacent thicker teeth 82 are abutted against the circumference of the step 66. In this state, the pinion 72 has completed a 60° clockwise turn from the state shown in FIG. 11 (corresponding to the absolute neutral position of the steering wheel). If the rotor 56 is rotated any further, the step 66 merely slides on the end faces of the thicker teeth 82, and no rotating force is exerted on the pinion 72, and thus, the pinion 72 assumes a stand-still position. The pinion 72 maintains this stand-still position, as shown in FIG. 14, until the rotor 56 completes another counterclockwise full revolution, to allow the gear teeth 69 to engage another thicker teeth 82.

In the state shown in FIGS. 12 through 14, the opening 68 of the rotor 56 is not aligned with the opening 84 of the pinion 72, so that no neutral position detection signal is output from the photo-interrupter 71. When the steering wheel is turned clockwise by the driver, the direction of rotation of the rotor 56 and pinion 72 are reversed.

As described above, with every complete revolution of the rotor 56, (clockwise or counterclockwise), the pinion 72 is rotated by 60°. Accordingly, the openings 68 and 84 are not aligned until the rotor 56 is rotated six times from the absolute neutral position of the steering wheel, so that no neutral position detection signal is output from the photo-interrupter 71.

Provided that the steering mechanism is designed so that the rotation of the steering wheel is locked when it is turned, for example, five times clockwise and counterclockwise from the neutral position of the steering wheel, respectively, it is only when the steering wheel is in the absolute neutral position that a neutral position detection signal is output within the lock-to-lock span of the steering wheel. Accordingly, whether the steering wheel is in the neutral position or not can be detected based on the presence or absence of the neutral position detection signal.

Unlike conventional detectors, the detection signal is not output every time the steering wheel is turned 360°, but is output only when the steering wheel is in the absolute neutral position. Accordingly, the neutral position of the steering wheel can be accurately detected without resorting to complex circuitry on devices. Moreover, even when the steering wheel is turned while the engine is stopped, whether the steering wheel is in the neutral position or not can be judged depending on the presence or absence of neutral position detection signal at the staring of the engine.

Although three embodiments of the present invention have been described herein, it should be apparent to those skilled in the art that the present invention may be embodied in many other specific forms without departing from the scope of the invention for example:

1) The number of the gear teeth (18 in the above embodiment) of the pinion 72 may be changed. In this case, the number of rotation of the rotor 56 and the number of the neutral position detection signals to be output will be modified corresponding to the number of gear teeth of the pinion 72.

Figure 15:
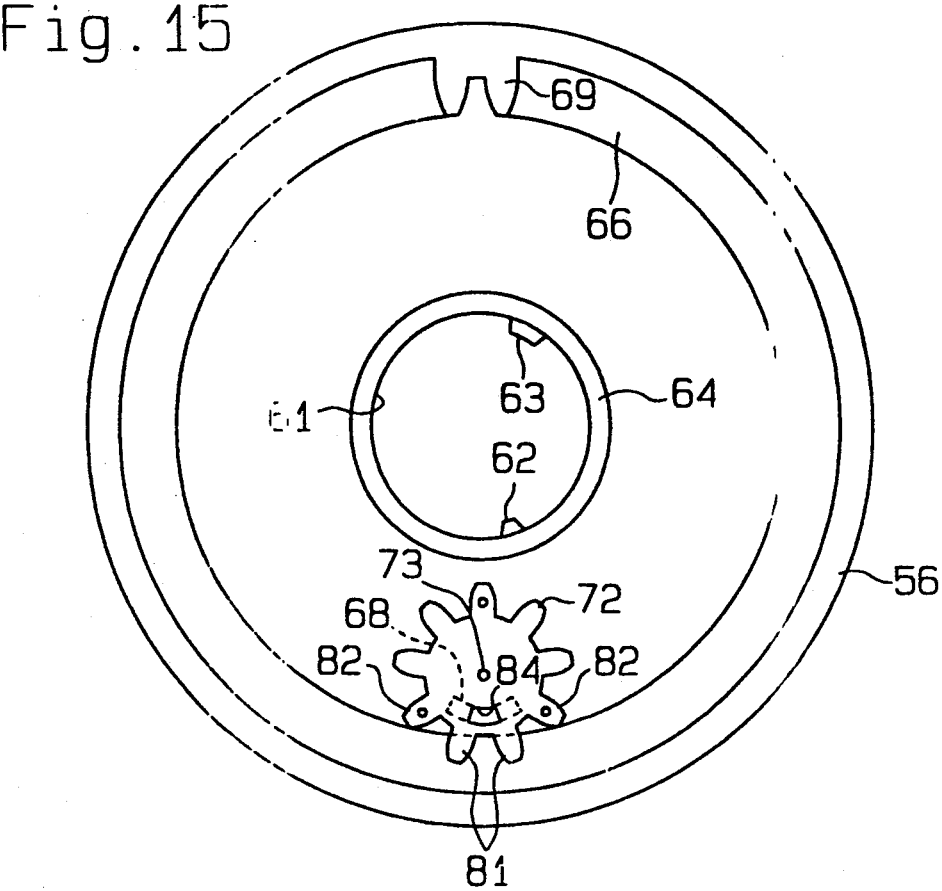
FIG. 15 is a partial plan view of a detector according to another embodiment of the invention.
Figure 16:
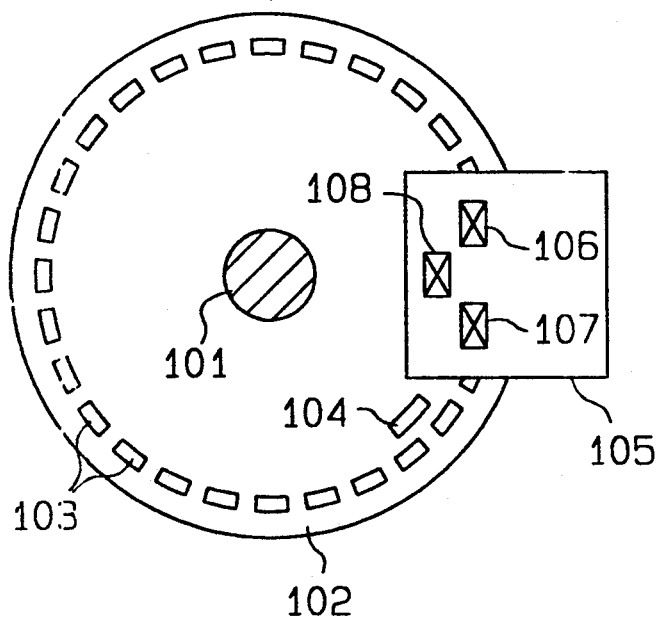
FIG. 16 is a plan view of a conventional detector.

2) As shown in FIG. 15, the step 66 may be provided on the outer circumference of the rotor, and the gear teeth 69 can be formed on the inner circumference thereof. The pinion 72 abuts against the step 66 from the inside of the rotor 56, and also engages the gear teeth 69. The operation of the detector is similar to that of the above embodiments, except that the rotor 56 and the pinion 72 are rotated in the same direction.

3) The neutral position detector according to the present invention may be applied, not only for the detection of the neutral position, but also for detecting a predetermined position of the steering wheel.

What is claimed is:

1. A neutral position detector for detecting a predetermined position of a steering wheel, comprising:
   first rotor means rotating integrally with a steering shaft;
   said first rotor including first means for detecting the predetermined position of the steering wheel;
   second rotor means rotatably interlocked with said first rotor means;
   power transmission means for driving said second rotor means by a predetermined rotation angle each time said first rotor means completes one revolution;
   said second rotor means including second means for detecting the predetermined position of the steering wheel; and
   sensor means for outputting a detection signal when said first detecting means is aligned with said second detecting means.

2. The neutral position detector according to claim 1, wherein said first detecting means is an opening defined in said first rotor means;
   wherein said second detecting means is an opening defined in said second rotor means;
   wherein said sensor means is a photo-interrupter including a light emitting element and a light receiving element, for outputting a predetermined detection signal when the light from said light emitting element passes through said openings of said first and second detecting means.

3. The neutral position detector according to claim 1, wherein said power transmission mechanism includes:
   a disc which is integrally rotatable with said first rotor means;
   said second rotor means includes a Geneva gear having a plurality of notches disposed at predetermined angles; and
   a roller connected to said disc, and causes said Geneva gear to rotate by intermittently engaging said notches.

4. The neutral position detector according to claim 1, wherein said power transmission mechanism includes:
   intermittent gear teeth provided on said first rotor means, which are integrally rotatable with said first rotor means;
   a plurality of gear teeth formed in said second rotor means which rotate integrally therewith, and which transmit the rotation of said first rotor means to said second rotor means under engagement with the gear teeth of said intermittent gear, and which abut against an untoothed circumferential portion of said intermittent gear; and
   stopper means attached to said second rotor means for stopping the rotation of said second rotor means, while the gear teeth of said second rotor means are disengaged from the gear teeth of said intermittent gear.

5. The neutral position detector according to claim 1, wherein said power transmission mechanism includes:

said first rotor means includes an intermittent gear having teeth, said intermittent gear is rotatable integrally with said first rotor means;

wherein said second rotor means includes a first set of rotatable gear teeth which transmit the rotation of said intermittent gear to said second rotor means, by engaging the teeth of said intermittent gear; and wherein said second rotor means further includes a second set of rotatable gear teeth which transmit the rotation of said first rotor means to said second rotor means, by engaging the teeth of said intermittent gear when said first rotor is rotated.

6. The neutral position detector according to claim 1, wherein said first and second detecting means are formed in at least one of said first rotor means and said second rotor means for detecting the rotation angle of the steering shaft.

* * * * *